Aug. 13, 1929.  J. REED ET AL  1,724,414
SCALE MECHANISM FOR AUTOMATIC FEEDERS
Filed Nov. 18, 1927   2 Sheets-Sheet 1
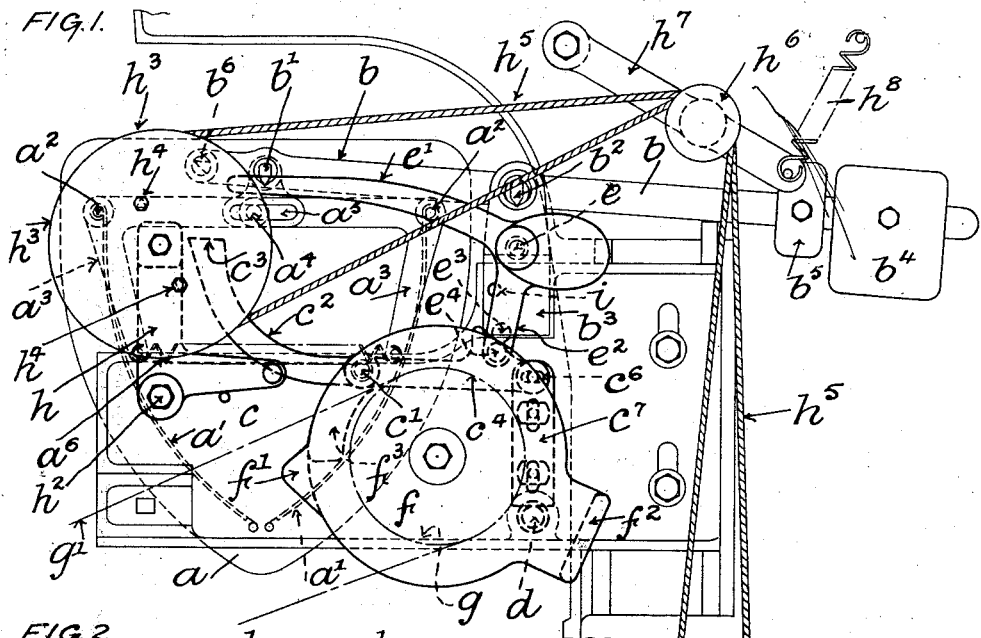
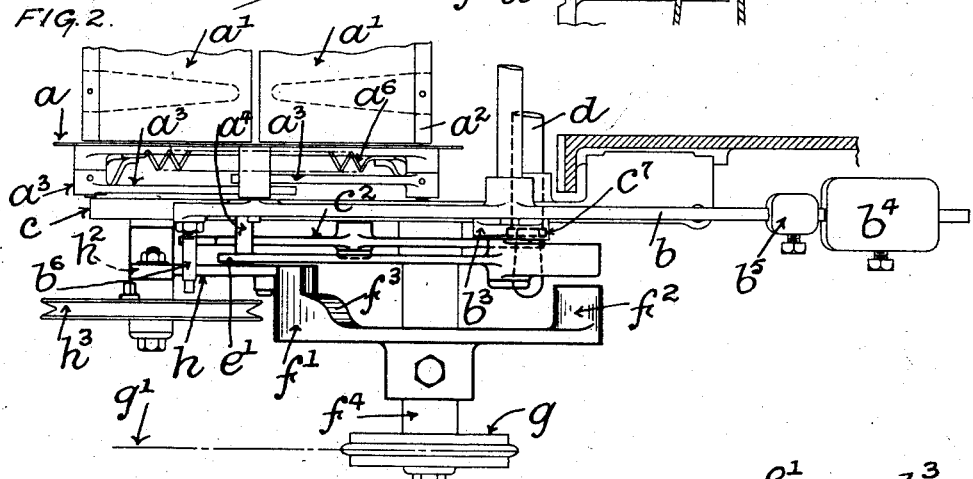
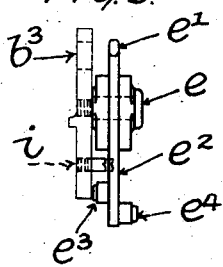
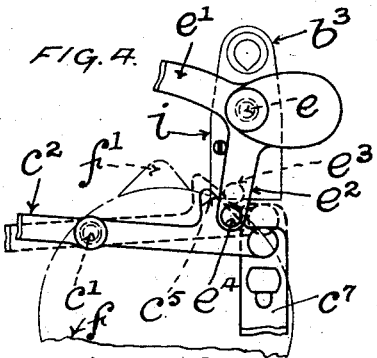
INVENTORS:
James Reed
Frank Booth
BY: Rueger, Boyer & Bakeler
ATTORNEYS.

Patented Aug. 13, 1929.

1,724,414

UNITED STATES PATENT OFFICE.

JAMES REED AND FRANK BOOTH, OF OLDHAM, ENGLAND, ASSIGNORS OF ONE-THIRD TO PLATT BROTHERS AND COMPANY LIMITED, OF OLDHAM, ENGLAND.

SCALE MECHANISM FOR AUTOMATIC FEEDERS.

Application filed November 18, 1927, Serial No. 234,148, and in Great Britain November 25, 1926.

This invention has reference to improvements in and connected with automatic feeding apparatus for feeding fibrous materials to carding engines or other preparing machines and concerns in particular the scale mechanism of such apparatus and the means for controlling the same.

Our improvements will be more readily understood by a consideration of United States patent specification No. 1,476,476, which relates to automatic feeding machines.

In this class of apparatus an inclined spiked lattice is used which lifts the material from a hopper and delivers the fibre to a scale or weighing machine which empties onto a horizontal lattice, creeper or the like which conveys the weighed fibre to the card or the like.

Our object is to simplify the scale mechanism and its actuating parts and to render the operations more definite or certain.

As is desirable for yarns produced on the condenser system the arrangement will ensure either a definite weight deposit, or none, in the latter case making a break on the feed lattice which, if unseen by the attendant, is made obvious at a subsequent stage; or if used for worsted or cotton preparation treatments the scale will deposit at definite intervals irrespective of the weight and without alteration of the mechanism, it being only necessary to restrict the movement of a simple part, as will be later explained.

The drawing illustrates the invention:—

Fig. 1 being a sectional side elevation showing the improved scale motion mechanism.

Fig. 2 is a plan of Fig. 1.

Figs. 3 and 4 are detached detail views.

Figure 5:
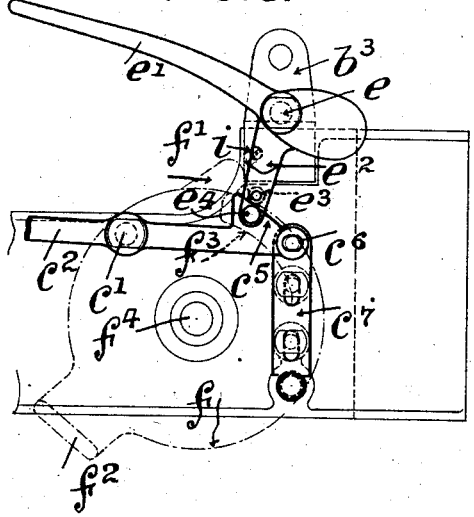
Figs. 5 and 6 are detail views showing in front elevation and sectional side view respectively the disposition of the mechanism which permits an opening of the scale pan only when a definite weight is delivered into the scale pan so that it overbalances.
Figure 6:
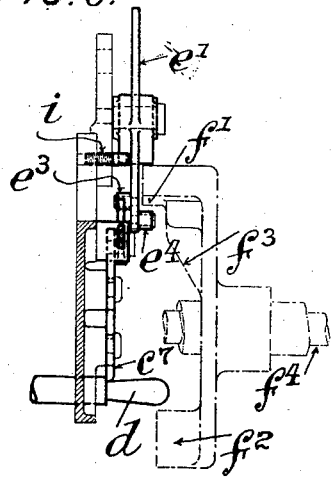
Figure 7:
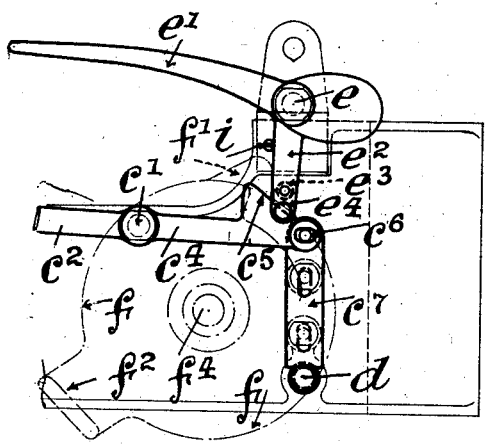
Figs. 7 and 8 are detail views showing in front elevation and sectional side view respectively the disposition of the mechanism for insuring a definite opening of the scale pan for each cycle of operation.
Figure 8:
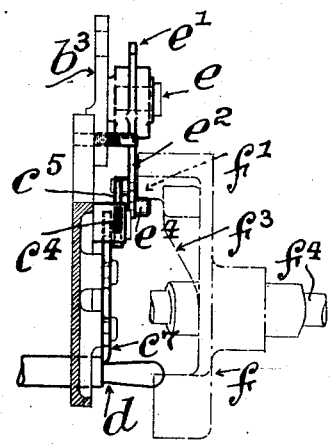

We utilize a scale pan consisting of end pieces $a$ and two curved longitudinal sheet metal lengths $a'$, $a'$ which are hinged so as to be pendent, and whose lower beaded edges come together along a longitudinal dividing line when the pan is closed. The sheet metal lengths $a'$, $a'$ are preferably hinged upon spindles or axles at $a^2$, $a^2$ which at the mechanism end have bell-crank levers $a^3$, $a^3$, applied, so that when the lengths of the scale pan are closed the upper arms of the bell-crank levers lie side by side one to another, a projecting pin $a^4$ in a slot $a^5$ forming the interconnecting means. The pendent arms of the bell-crank levers $a^3$, $a^3$ are coupled by a coiled spring $a^6$. If the projecting pin $a^4$ be pressed-on, the longitudinal sides $a'$, $a'$ of the pan will open or part angularly and the contents will fall out, whilst, on pressure ceasing, a closure is effected due to the spring $a^6$. The manner of opening the scale pan by acting on the projecting pin $a^4$ will be later described.

The scale pan is hung by knife edges $b'$ in lever arms $b$ and these lever arms are in turn hung on knife edges $b^2$ in suitable auxiliary brackets $b^3$, and, adjustable balance weights $b^4$, $b^5$ are used, these being set according to the weight the scale pan is to overbalance at. Upon a main supporting bracket $c$ we pivot at $c'$ a cranked lever which has an upwardly directed arm $c^2$ with shaped top $c^3$ onto which drops a projection $b^6$ from the forward end of the balance lever $b$ when the scale pan overbalances due to having received its weight of fibre. The said cranked lever has also a horizontal arm $c^4$ with incline $c^5$, and bored extremity $c^6$ from which is hung a pendent detent member or latch $c^7$ slidably guided in the frame of the machine, which detent, when in its lowermost position, engages a shoulder formed on a slidable spring-pressed rod or cross-bar $d$ controlling a clutch, or other equivalent mechanism governing the driving of the spiked lattice supplying the fibre to the scale mechanism, and thus holds the rod in its clutch-operating position.

There is provided, conveniently in connection with the auxiliary bracket $b^3$ carrying the counter-balanced scale pan lever, and on the mechanism side, a shaped bell-crank lever fulcrumed at $e$ which lever is likewise counter-balanced and such lever has a bent arm $e'$ directed over the before described projecting pin $a^4$, whilst its pendent arm $e^2$ has a roller $e^3$ in the rear and a roller $e^4$ at the front. The incline $c^5$ on the horizontal arm $c^4$ of the crank lever engages the rear roller $e^3$ whereby, on actuation of the said crank lever, the arm $e^2$ of the lever $e$ is swung outward, or toward the right in Fig. 1, and thus carries the front roller $e^4$ into position for actuation by a cam $f'$ formed on a solid revolving cam disk $f$ to be hereinafter described. The actuation of the crank lever also causes the detent $c^7$ to slide out of engagement with the clutch rod $d$, which, under the action of its spring, slides outward, thus disengaging the clutch so that feeding of material to the scale pan ceases. The revolving cam disk $f$ is mounted on a shaft $f^4$ in the main bracket $c$ and is driven by a chain wheel $g$ and chain $g'$, or in any other approved fashion, and it has three shaped cam projections, the first one, $f'$, of which is adapted to act on the roller $e^4$ thereby to swing the lever arm $e'$ and cause said arm to depress the pin $a^4$ whereby the scale pan members are swung on their pivots away from each other toward their opening position. The second cam $f^2$ acts upon a bell-crank lever $h$ fulcrumed at $h^2$ and supporting a cord driven pulley $h^3$ with one or more projections or lugs $h^4$ on its inner face and which pulley $h^3$ is held in place by spring tension. In the example shown, the driving rope $h^5$ passes over small double guide pulleys $h^6$ down to the main shaft. The double guide pulleys are carried on pivoted lever arms $h^7$ the free end of which is acted on by a spring $h^8$. Consequently the pulley is under spring tension but the rope $h^5$ is free to slip. There remains the third cam $f^3$ and the function of this third cam $f^3$ is to engage the end face of the cross bar or rod $d$ of the clutch or like control and push the same back into clutch-engaging position and thus restart the spiked lattice drive.

Presuming the scale pan to be filled with fibre to the proper weight and to have overbalanced, then, by overbalancing, the projection or pin $b^6$ on scale balance lever has been lowered onto the upper edge $c^3$ of the crank lever.

The cord driven pulley $h^3$ with one of its lugs $h^4$ now finds the said projection or pin $b^6$ in the path of one of the said lugs and so the projection or pin and cranked lever are acted on and the cranked lever slightly depressed, this action lifting the pendent detent $c^7$, which releases the cross bar $d$ holding the clutch in. The result is, the clutch is thrown out (by spring or weight) and the driving of the spiked lattice lifting from the hopper ceases. The "incline" $c^5$ on the crank lever arm $c^4$ is also affected, and, acts on roller $e^3$ to set the pendent limb $e^2$ of the scale pan opening bell-crank lever thereby to place the roller $e^4$ in the path of cam $f'$ in the manner hereinbefore described and as illustrated in broken lines in Fig. 4.

The cam plate $f$ is revolving and cam $f'$ acts on the roller $e^4$, positively operating the scale-pan opening bell crank, the shaped arm $e'$ of which acts on the projecting pin $a^4$ and positively opens the scale pan against the action of the spring $a^6$ allowing the contents of the scale to fall out onto the receiving creeper lattice which is not shown but is well known. The cam $f'$ is shaped to allow the spring $a^6$ to gradually and quietly close the hinged longitudinal halves $a'$, $a'$ of the scale pan. Cam $f^2$ then acts on the bell-crank lever $h$ supporting the cord driven pulley $h^3$ thereby shifting the bell crank and pulley angularly out of position thus releasing the scale pan which rises to the empty or re-balanced position. As cam $f^2$ goes off, the pulley on the bell crank lever $h$ is pulled back into normal position by the already described spring arrangement. It has already been suggested, that, when the lug $h^4$ on the pulley $h^3$ strikes the projection or pin $b^6$ on the scale balanced lever $b$, the driving rope $h^5$ can slip so no abrupt action results. Cam $f^3$ which is conveniently merged into cam $f'$, now acts on the end of the cross-bar $d$ to move same endwise and again operate the driving clutch, the cross-bar $d$ being ultimately retained in this position by the pendent detent $c^7$.

Under the improved system of working described it is seen that a solid one piece cam plate $f$ actuates the main features direct without intermediary devices or mechanism needing adjustment and so a great simplification results.

If the scale pan does not get its full and proper weight of fibre, the pan does not overbalance, and will not open but must miss a deposit, the cam $f'$ missing the roller $e^4$. If positive and definite regular opening is desired an adjustable pin $i$ which is fitted in the auxiliary bracket $b^3$ is unscrewed or pulled out (see Figs. 3 and 4) until it is in the path of pendent arm $e^2$ of the scale pan opening group, thus maintaining the roller $e^4$ at front of pendent arm $e^2$ in the path of cam $f'$ at all times, resulting in the opening of the scale pan once for each revolution of the cam plate $f$. Thus, just so long as the pin $i$ is withdrawn, so will the scale pan open once for every revolution of the cam $f$ no matter what weight of fibre is contained. Any simple provision other than a screwed pin $i$ may be used to hold the pendent limb $e^2$ in the definite position desired to ensure regular opening.

The scale pan and beam are mounted on knife edges in case-hardened bushes and are finely balanced so that once the scale has moved, it continues to go down without oscillation. The entire mechanism is simple and the motion serves a two fold purpose in that it gives (a) a full weight deposit, or none in the event of supply failing, thus making a definite break in the feed lattice as desirable for condenser yarns; or (b) regular deposits irrespective of weight and as may be preferred for worsted or cotton preparation systems where subsequent opportunities for doubling occur.

All movements of the mechanism it will be appreciated are definitely controlled.

We declare that what we claim is:

1. A device of the character described, comprising a balanced scale pan mechanism, a fulcrumed lever disposed in juxtaposition to said mechanism, and adapted to be acted on by the balanced scale pan mechanism, a shaped scale pan operating lever fulcrumed in position to act on the scale pan mechanism to open the same, an extension arm from said shaped lever, a normally inoperative roller projecting from said arm, means for swinging said arm thereby to carry the roller into operative position, a movable stop adapted to prevent the return of said arm and thereby retain the roller in operative position, and a cam adapted to engage said roller thereby to operate the shaped lever, the organization being such that the scale pan can be opened either under a predetermined load or once for each cycle of operation.

2. A device of the character described, comprising in combination a balanced suspended scale pan, a fulcrumed lever mechanism having a scale pan operating arm and a second arm, rollers projecting from said second arm, an adjustable device for limiting the movement of said second arm, a fulcrumed lever operable on the actuation of said scale pan to engage one of said rollers and set the lever in operative position, and a cam device adapted to contact with the other roller thereby to operate said lever, the organization being such that the scale pan may be set for delivery at a definite weight or once for each complete cycle of operation.

3. A device of the character described, comprising in combination a balanced scale pan, a fulcrumed lever adapted for operation by the fall of the scale pan, a fulcrumed scale pan operating lever, a pendent arm carried by said scale pan operating lever, rollers projecting from said pendent arm, adjustable means disposed in the path of said arm for limiting the movement of said scale-pan operating lever, and a cam adapted to contact with one of said rollers thereby to operate said lever, the organization being such that the scale pan may be opened either under a predetermined load or once for each complete cycle of operation without regard to load.

4. A device of the character described, comprising a pair of separable members adapted when in contact with each other to form a scale pan, means operative normally to retain said members in pan-forming relation and to permit automatic separation thereof under a predetermined load, means operative on partial separation of said members to complete the separation thereof thereby to deliver the load from said pan, means for rendering said separating means inoperative on the delivery of said load thereby to permit return of the members to normal position under the action of said retaining means, and means for setting said separating means for operation at predetermined intervals without regard to the load in said scale pan.

5. A device of the character described, comprising a pivotally mounted counter-balancing lever, a pair of separable members pivoted for swinging movement toward each other to form a scale pan, said members being pivotally connected to said lever thereby to rock the same when the members are moved, resilient means for normally retaining said members in pan-forming relation and adapted to permit them to swing apart under a predetermined load, a second pivoted lever disposed adjacent to said members, means carried by said first lever for engaging said second lever when said separable members are moved away from each other, rotatable means adapted to exert pressure on said engaging means thereby to swing said second lever on its pivot, a third lever pivotally mounted adjacent to said separable members and having means for operating said members into separated position, said lever being normally inoperative, cooperating means carried by said second and third levers for swinging the latter on its pivot to carry the same into operative position, and means for further swinging said lever on its pivot thereby to operate said pan-forming members into open position.

In testimony whereof we have signed our names to this specification.

JAMES REED.
FRANK BOOTH.